United States Patent
Kolacz

(10) Patent No.: US 7,900,779 B2
(45) Date of Patent: Mar. 8, 2011

(54) PARTICLE CLASSIFIER

(75) Inventor: Jacek Kolacz, Bärums Verk (NO)

(73) Assignee: Comex AS, Rud (NO)

(*) Notice: Subject to any disclaimer, the term of this patent is extended or adjusted under 35 U.S.C. 154(b) by 0 days.

(21) Appl. No.: 11/596,919

(22) PCT Filed: May 13, 2005

(86) PCT No.: PCT/NO2005/000161
§ 371 (c)(1),
(2), (4) Date: Nov. 17, 2006

(87) PCT Pub. No.: WO2005/115641
PCT Pub. Date: Dec. 8, 2005

(65) Prior Publication Data
US 2007/0241035 A1 Oct. 18, 2007

(30) Foreign Application Priority Data
May 18, 2004 (NO) .................................. 20042052

(51) Int. Cl.
*B04B 5/12* (2006.01)
(52) U.S. Cl. ...... 209/714; 209/133; 209/135; 209/139.2; 209/725
(58) Field of Classification Search .................. 209/711, 209/714, 710, 713, 719, 133, 135, 139.2
See application file for complete search history.

(56) References Cited

U.S. PATENT DOCUMENTS

| | | | | |
|---|---|---|---|---|
| 3,308,949 A | * | 3/1967 | Schauer | 209/133 |
| 3,670,886 A | * | 6/1972 | Hosokawa et al. | 209/139.2 |
| 4,260,478 A | * | 4/1981 | Hosokawa et al. | 209/139.2 |
| 4,523,990 A | * | 6/1985 | Duyckinck | 209/138 |
| 5,120,431 A | * | 6/1992 | Cordonnier | 209/135 |
| 6,739,456 B2 | * | 5/2004 | Svoronos et al. | 209/725 |

FOREIGN PATENT DOCUMENTS

DE 197 08 956 9/1998
JP 7-328463 12/1995

* cited by examiner

*Primary Examiner* — Terrell H Matthews
(74) *Attorney, Agent, or Firm* — Dennison, Schultz & MacDonald

(57) ABSTRACT

Particle classifier (2) for separating solid particles in a flow of gas and particles (1) into two fractions depending on size by means of gravitation force, air resistance force and applied centripetal force. A mixture of gas and particles is charged well dispersed to a classifier inlet zone (3) from which the mixture is brought into contact with a rotor (6) in a first separation zone (5) having the form of a free rotor chamber. Gas and fine particles are allowed to escape through an upper outlet (9) while the coarse fraction of the particles is forced to pass through a second separation zone and subsequently to leave through a lower outlet (15). Vertically below the first separation zone (5) a second separation zone having the form of an annular chamber (11) is arranged, radially outwards delimited by stationary vanes (12) that are interspaced circumferentially around the rotor, the distance between the rotor periphery and said stationary vanes being less than the distance between the rotor periphery and the wall (7) of the classifier's first separation zone (5).

10 Claims, 3 Drawing Sheets

PARTICLE CLASSIFIER

Figure 1:
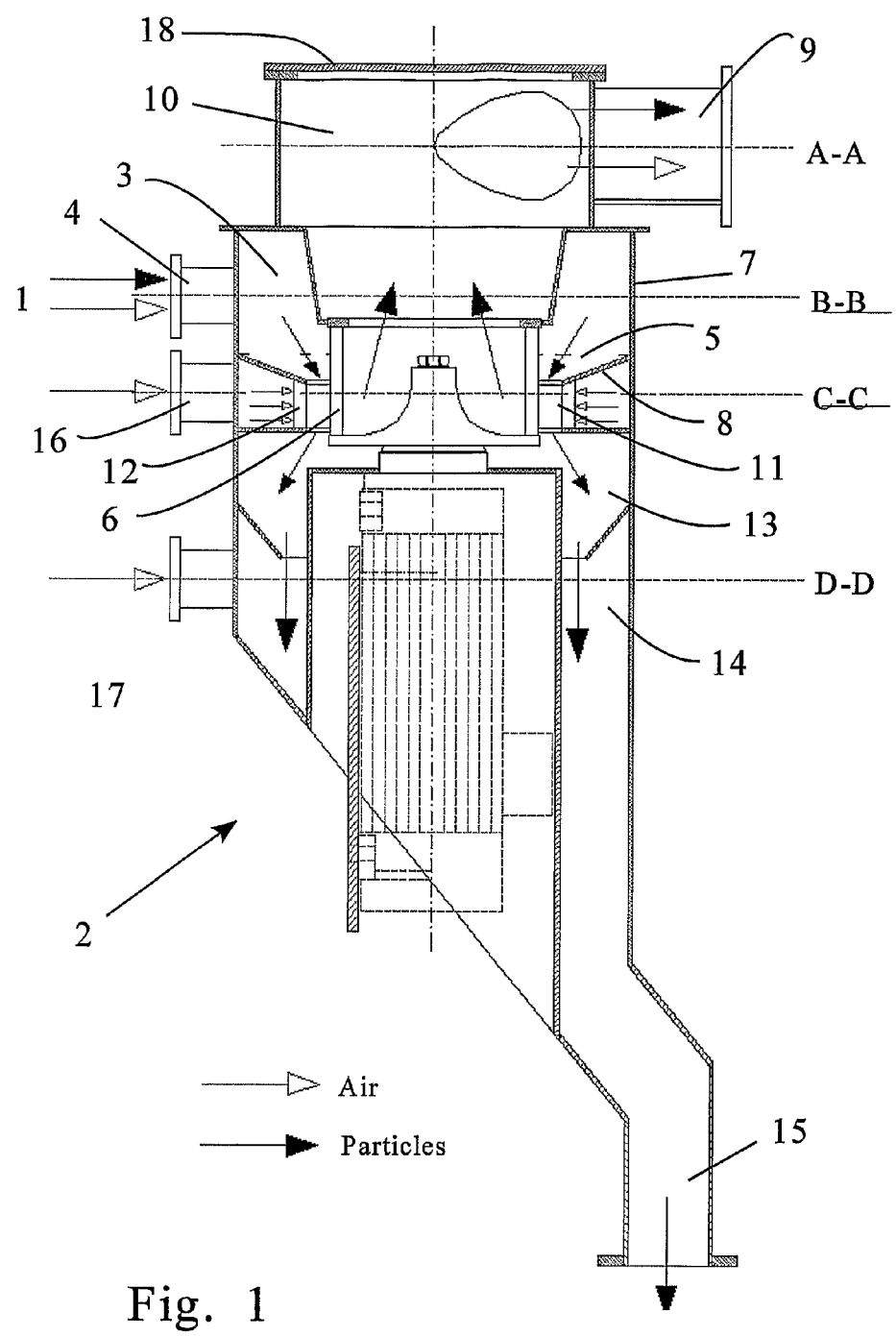

This application is a 371 of PCT/NO2005/000161 filed on May 13, 2005.

The present invention concerns a particle separator or classifier. More particularly the present invention concerns a particle classifier for separating solid particles in a mixture of gas and particles into two fractions by means of air resistance force, gravitation force and applied centripetal force.

BACKGROUND

It is prior art technology to separate (or classify) particles in cyclones that utilize centrifugal force (centripetal force) to separate small particles from larger particles as effectively as possible. Apparatuses that are suited for the purpose are so-called "forced vortex classifiers" which comprise a rotor with blades between which the particles must pass to escape with the fine fraction. All the larger particles are here effectively separated out.

It is, however, a problem to quantitatively separate all the fine particles from the coarse fraction. In the discussion below we distinguish between two types of forced vortex classifiers, namely the "free rotor" type and the "stationary vane" type.

The free rotor type has a rotor that far from fills the diameter of the house in which it is mounted which renders it possible for a flow of particles to be charged pneumatically and well dispersed in a flow of air to the outside of the rotor periphery. This is desirable e.g. because it is effective with respect to the volume of air/particles that are able to pass through in a certain period of time and because it leads to comparatively low rotor wear etc. from the larger particles that never come in contact with the rotor. It has unfortunately the disadvantage that a certain amount of the finer particles may stick to the surface of larger particles and thus leave with the coarse fraction.

In a stationary vane classifier there is only a small gap between the rotor and a rim of stationary blades or vanes that are arranged like a circumferential rolling door around the rotor and through which air is fed to the classifier. The particles (material) that are to be classified are charged to the classifier without air or with only a little air to disperse the particles. The particles belonging to the coarse fraction are generally moving in a direction downwards within the classifier in the general direction of the outlet for this fraction, and are along their way several times "knocked" back and forth between the stationary vanes and the outer part of the rotor blades, while t the same time being exposed to a severe turbulence. Due to these impacts the fine particles that stick to the larger particles are released and thereby allowed to follow the fine fraction up between the rotor blades. The advantage with the stationary vane classifier is that the fine fraction is more effectively separated from the coarse fraction.

While the free rotor type is quite effective with respect to charge of a mixture of air and particles in a dispersed state but less effective with respect to separate the fine particles from the coarse fraction, the stationary vane classifier is superior with respect to separate fine particles from the coarse fraction but has a comparatively lower capacity with respect to volume/time unit that may be charges thereto, due to its less effective dispersion ability.

OBJECTS

It is a primary object of the present invention to provide a particle classifier that is able to classify particles into two fractions with a higher efficiency than what previously has been possible, i.e. with a coarse fraction that contain very few fine particles.

It is thus a secondary object of the present invention to provide a particle classifier that combine the best characteristics from two known constructions and which are not encumbered by the disadvantages of any of said classifiers.

It is furthermore an object to provide a particle classifier that enables charge of a dispersed air/particle flow in the same manner as to the free rotor type but with a more effective separation of the fine particles from the coarse fraction.

THE INVENTION

Said objects are achieved by the present invention as defined by claim 1.

Preferred embodiments are disclosed by the dependent claims.

The particle classifier according to the present invention comprises a combined separation chamber that comprises a first, upper separation zone that has the principle function of a "free rotor" zone. Air and particles are charged to this zone, preferably mainly tangential, providing a very good dispersion of air and particles in the whirling flow that is thus obtained in this first zone. The rotor has a height allowing it to extend down into the second, lower zone of the separation chamber which is designed as a stationary vane chamber. In this zone stationary vanes as described above are arranged close around the rotor blades.

The presence of this second, lower separation zone ensures that any fine particles sticking to the larger particles and thereby unwanted have passed through the classifier's first, upper separation zone become exposed to the severe mechanical strain that is typical for a stationary vane classifier. In practice almost all the fine particles are thereby released from the larger particles and allowed to pass upwards and out with the fine fraction.

Figure 2:
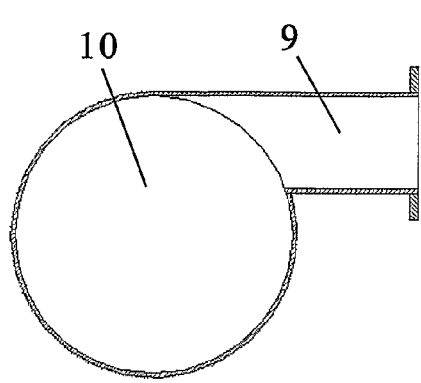
Figure 2:
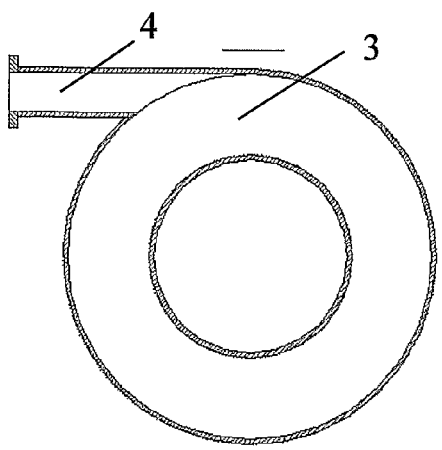
Figure 2:
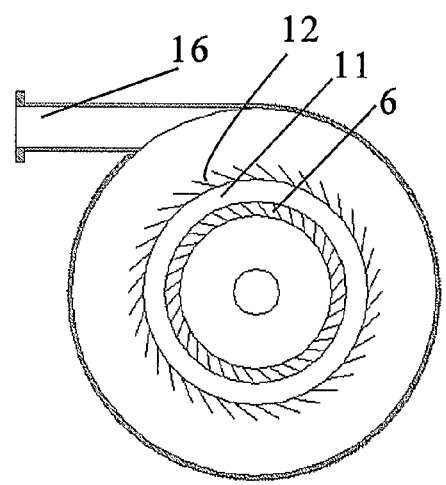
Figure 2:
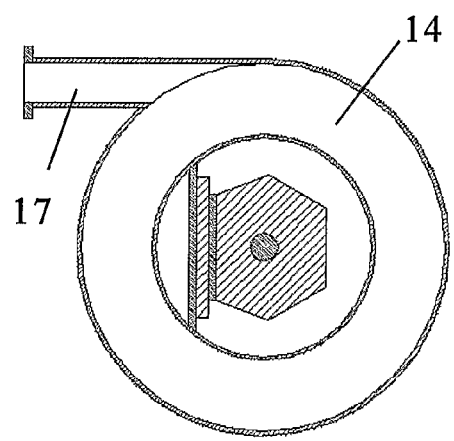
Figure 3:
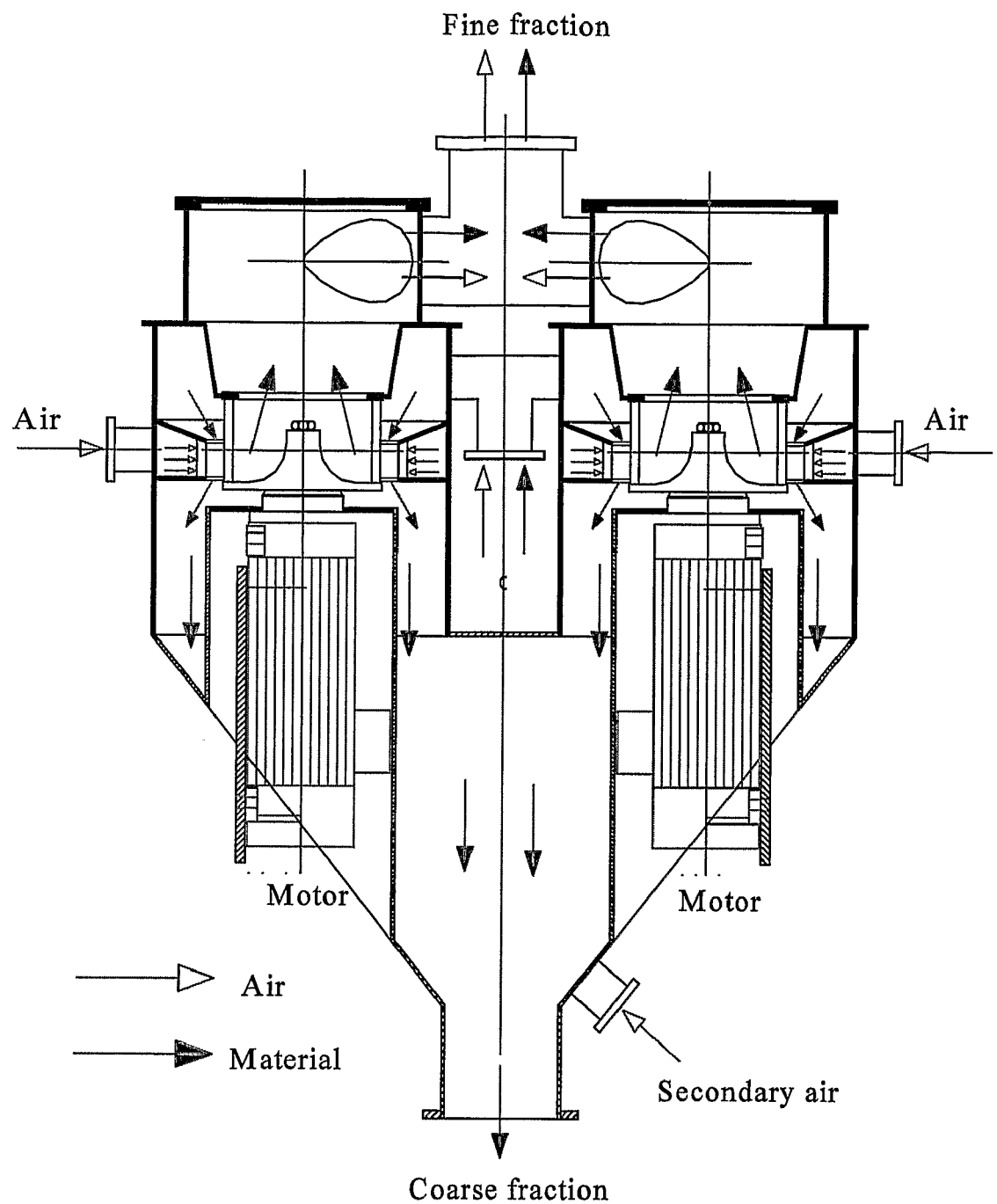

Below the invention is described in further detail in the form of an exemplary embodiment with reference to the enclosed drawings, where:

FIG. 1 is a vertical cross-sectional view of a particle classifier according to the present invention, FIG. 2 displays horizontal sections at four different vertical levels of the classifier of FIG. 1, and FIG. 3 is a cross-sectional view of an alterative embodiment of the invention, comprising two classifiers in parallel.

The mixture 1 of air and particles are charged to the classifier 2 in an inlet zone 3 through a suitable conduit 4. The inlet zone 3 is shown as a horizontal section B-B in FIG. 2b. As here disclosed the inlet zone 3 has an annual horizontal section in which the mixture 1 is set in rotation. To escape from inlet zone 3 the gas is forced to circulate downwards as evident from the wall design shown in FIG. 1. By this downwards circulation the mixture of air and particles enters the first separation zone 5 constituting the free rotor zone of the classifier. In this zone of the classifier a rotor 6 is centrally arranged with a fair distance between the periphery of the rotor 6 and the outer wall 7 of the classifier. Already in this section the strong centripetal acceleration forced onto the mixture of air and particles facilitate an upward movement of the finest particles between the blades of the rotor 6, in the direction towards and subsequently through an outlet 9 from the classifier located at the classifier upper portion 10. The top portion 10 and the outlet 9 are also shown in FIG. 2a.

From a defined vertical level within the first separation zone 5 a tapered partition wall 8 extends inwards and downwards from the outer wall 7 thus forming an inverted cone section. This partition wall 8 leads the remaining larger particles along with any fine particles stuck to the larger ones as well as a minor amount of air down into a much smaller annular chamber 11 which constitutes the classifier's second separation zone or the so-called stationary vane chamber. Outwards the annular chamber 11 is delimited by stationary vanes arranged concentrically around the rotor 6. The annular chamber 11 between the rotor 6 and vanes 12 is so narrow that particles circulating around the rotor with a small downwards angle of inclination, several times will come into physical contact with both rotor blades and the surrounding vanes before having moved vertically below the rotor 6. While the comparatively large particles that are influenced the most by gravitation and the applied centripetal acceleration, will move downwards past the rotor 6 and down into lower annual chambers 13 and 14 of the classifier ant further on through an outlet 15 for the coarse fraction, the finer particles that are knocked off and released from the larger particles in the annular chamber 11 will follow the larger flow of air close to the centre of the rotor up to the outlet 9 at the classifier top. The annular chamber 11 may also be charged with so-called secondary air through a secondary inlet 16 in order to "balance" the effect of the rotor 6 so that a best possible interaction between the rotor 6 and the surrounding rim of stationary vanes is obtained.

In addition to a charge of secondary air at an elevation corresponding to the (lower part of the) rotor, additional secondary air may optionally be charged at a level even lower in the classifier through a conduit 17. It is therefore fair to say that the prior art classifiers are two step classifiers while the classifier according to the present invention is a three step classifier.

In the description above there is used the designation first and second separation zone rather than first and second classifier chamber. This relates to the fact that the different zones preferably are formed principally within one common chamber, i.e. without a clear division between the zones. According to the embodiment shown in FIG. 1, radially outside the rotor 6 in a direction vertically downwards, there is a first (uppermost) region with a constant diameter determined by the classifier wall 7. Below this region there is a region with a diminishing diameter determined by the partition wall 8 and further below there is a region with a constant (effective) diameter determined by the vanes 12. It is probably strictly correct to say that the second separation zone comprises both the first mentioned vertical regions while the third separation zone only comprises the region that is radially outwards delimited by the stationary vanes 12. To denominate this second separation zone as a chamber does not seem right since there is no physical division between the zones. According to embodiments different to that of FIG. 1 there may be a clearer division between the different zones.

The division between the second classifier zone 5 and the annular chamber 11 constituting the third separation zone may be obtained in other ways than the one shown in the enclosed drawings. As an example the rotor 6 may have blades with varying diameter in upper and lower region so that the effective rotor diameter is diminished smoothly or abruptly in its upwards direction. Alternatively or additionally the stationary vanes may be designed with an inclined inner edge with an inward inclination towards the rotor 6 downwards from above, thus eliminating the need for a partition wall 8. The result is the same, the classifier comprises at least two zones at vertically different levels, of which at least one zone has the form of a free rotor zone while there is at least one zone below said free rotor zone that has the form of a stationary vane zone. Normally there will be used one rotor 6 that has an axial extension (height) corresponding the sum of the heights of the two separation zones 5 and 11. Alternatively the rotor 6 may be replaced by two rotors 6 and 6' that are arranged concentrically with one another, allowing rotor 6 in the separation zone 5 to spin with a different rotational speed than rotor 6' in separation zone 11. The two rotors may also have different diameter.

A particularly convenient optional feature of the classifier is to provide the classifier top with an inspection cover 18, preferably transparent, that may easily be removed and through which replacement of the rotor may be done without a further disassembly of the classifier.

FIG. 3 shows a particular embodiment of the invention that may be preferred in some situations or for some applications, depending upon the capacity of the classifier in relation to requirements. The inner elements of the classifier according to FIG. 3 are fully consistent with the classifier described in relation to FIG. 2. The only new feature is that there is a common assembly of two classifiers working in parallel so that the overall capacity is doubled. In addition to—or instead of—increasing the capacity such a configuration allows a reduced rotor dimension which provides for even better separation characteristics.

In a corresponding manner it is possible around a central axis to assemble three, four or even up to six parallel classifiers in one common assembly to achieve a volume effective increase of capacity and/or increase in quality.

The skilled artisan will recognize that determining for the particle size to follow fine fraction and coarse fraction respectively are parameters like specific density of the particles, classifier diameter, rate of the air flow and rotational speed of the rotor. For a certain classifier and a defined type of particles the division between the coarse fraction and the fine fraction is to some extent adjustable by change of rate of air flow and rotor speed.

The classifier according to the present invention provides a very effective separation between coarse and fine fraction, i.e. with a very low amount of fine particles following the coarse fraction discharged at the classifier bottom.

The invention claimed is:

1. A particle classifier (2) for separating solid particles in a mixture of gas and particles (1) into a fine and coarse fraction depending on size by means of gravitation force, air resistance force and applied centripetal force, where a mixture of gas and particles are charged to the classifier well dispersed in an inlet zone (3) after which the mixture is brought in contact with a rotor (6) in a first separation zone (5) constituting an annular, "free rotor" chamber so that the gas and the fine particles are allowed to escape through an upper outlet (9) while the coarse fraction of the particles are discharged through a lower outlet (15), wherein vertically below the first separation zone (5) a second separation zone having the form of an annular chamber (11) is arranged, having stationary interspaced vanes (12) arranged circumferentially around the rotor, the distance between the rotor periphery and said stationary vanes (12) being less than the distance between the rotor periphery and the surrounding wall (7) that outward delimits the annular chamber of the classifier's first separation zone (5);

wherein separation of particles in the second separation zone is facilitated by air supplied through a second inlet (16); wherein particles in the first and second separation zones are separated by centripetal force;

and wherein trajectories of the coarse and fine fractions never collide.

2. A particle classifier as claimed in claim 1, wherein the second separation zone in the forth of an annular chamber (11) is arranged immediately below the first separation zone (5) only separated by a conical wall section (8) that is arranged to force the mixture of gas and particles into an annular chamber with smaller diameter than the outer diameter of the annular chamber constituting the first separation zone (5).

3. A particle classifier as claimed in claim 1, wherein the first separation zone (5) and the second separation zone comprised by the annular chamber (11) have a common rotor (6) with an axial extension corresponding to the height of the two separation zones combined.

4. A particle classifier as claimed in claim 1, wherein the classifier comprises an inspection cover (18) through which the rotor (6) may be inspected and replaced if required without 25 a further disassembly of the classifier.

5. A particle classifier as claimed in claim 1, wherein the radius of the annular chamber (11), from its centre to the stationary vanes, is constant, the vanes having equal width and being arranged substantially vertical.

6. A particle classifier as claimed in claim 1, wherein the inner radius of the annular chamber (11), from the centre of the classifier to the stationary vanes is increasing vertically upwards in the annular chamber (11), the vanes (12) being arrange inclined in relation a vertical plane or having a reduced width in a direction vertically upwards.

7. A particle classifier as claimed in claim 1, wherein the rotor (6) draws the contour of a cylindrical body when rotating.

8. A particle classifier as claimed in claim 1, wherein the rotor (6) draws the contour of a truncated-conical body when rotating.

9. A particle classifier as claimed in claim 1, wherein there are arranged separate rotors (6, 6') in separation zone (5) and separation zone (11) respectively, the rotor s (6, 6') being concentrically arranged with one another but optionally with different diameters and being arranged to spin with mutually independent speed.

10. A particle classifier as claimed in claim 1, wherein the classifier comprises a number of 2-6 classifiers being mounted in parallel in a common assembly to achieve a higher capacity and/or a further improved separation characteristic.

* * * * *